(12) United States Patent
Kato et al.

(10) Patent No.: US 9,381,886 B2
(45) Date of Patent: Jul. 5, 2016

(54) AIRBAG DEVICE

(71) Applicant: Autoliv Development AB, Vårgårda (SE)

(72) Inventors: Yoshiyuki Kato, Yokohama (JP); Koichi Miyagi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/408,904

(22) PCT Filed: May 29, 2013

(86) PCT No.: PCT/JP2013/064936
§ 371 (c)(1),
(2) Date: Dec. 17, 2014

(87) PCT Pub. No.: WO2013/190965
PCT Pub. Date: Dec. 27, 2013

(65) Prior Publication Data
US 2015/0137496 A1 May 21, 2015

(30) Foreign Application Priority Data
Jun. 22, 2012 (JP) ................................. 2012-141363

(51) Int. Cl.
*B60R 21/261* (2011.01)
*B60R 21/2346* (2011.01)
*B60R 21/26* (2011.01)
*B60R 21/233* (2006.01)
*B60R 21/231* (2011.01)

(52) U.S. Cl.
CPC ............... *B60R 21/26* (2013.01); *B60R 21/231* (2013.01); *B60R 21/233* (2013.01); *B60R 21/2346* (2013.01); *B60R 21/261* (2013.01); *B60R 2021/2612* (2013.01)

(58) Field of Classification Search
CPC .... B60R 21/26; B60R 21/261; B60R 21/233; B60R 21/2346; B60R 2021/23316; B60R 2021/23324; B60R 2021/2612; B60R 2021/23576; B60R 21/23123
USPC .................................. 280/736, 740, 729, 742
See application file for complete search history.

(56) References Cited

U.S. PATENT DOCUMENTS 8,181,989 B2 * 5/2012 Okuhara ............... B60R 21/207
280/729
8,668,224 B2 3/2014 Taniguchi et al.
(Continued)

FOREIGN PATENT DOCUMENTS

CN 101879885 A 11/2010
JP 2001-63502 A 3/2001
(Continued)

OTHER PUBLICATIONS

Japanese Patent Office, International Search Report of International Application No. PCT/JP2013/064936, Mailed on Jun. 25, 2013, 1 page.

*Primary Examiner* — Keith Frisby
(74) *Attorney, Agent, or Firm* — Brinks Gilson & Lione (57) ABSTRACT

An airbag apparatus that prevents a reverse flow of a gas between chambers to allow internal pressures of the chambers to be maintained. The airbag apparatus includes: a cushion portion with a divided internal space including a first chamber and a second chamber; a deflector surrounds a periphery of an inflator with a first gap therebetween to cover a gas ejection port of the inflator. The deflector has a first end portion projecting in a longitudinal direction and forming a space between the first end portions of the deflector and the inflator. A cloth cylindrical member surrounds a periphery of the deflector with a second gap therebetween. The cylindrical member projects from the first end portion of the deflector by a predetermined length so as to allow the first gap and the second gap to be covered in the first end portion side of the deflector.

9 Claims, 8 Drawing Sheets

(56) References Cited

U.S. PATENT DOCUMENTS

| | | | |
|---|---|---|---|
| 2007/0284862 A1* | 12/2007 | Kashiwagi | B60R 21/207 280/740 |
| 2010/0181749 A1 | 7/2010 | Sugimoto | |
| 2011/0298200 A1 | 12/2011 | Taniguchi et al. | |

FOREIGN PATENT DOCUMENTS

| | | |
|---|---|---|
| JP | 2003-40070 A | 2/2003 |
| JP | 2010-163142 A | 7/2010 |
| JP | 2011-126497 A | 6/2011 |
| JP | 2011-255714 A | 12/2011 |

* cited by examiner

AIRBAG DEVICE

BACKGROUND

1. Field of the Invention

The present invention relates to an airbag apparatus installed in a vehicle to inflate and deploy mainly in order to protect an occupant in case of emergency.

2. Description of Related Art

An airbag apparatus is a safety apparatus that operates in case of emergency, such as a vehicle collision, and includes, for example, a bag-like cushion portion. The cushion portion is inflated and deployed by a gas, during an emergency, to receive and protect an occupant. Various types of airbag apparatuses are available depending on the installation position or application. By way of example, a side airbag is known which inflates and deploys from a side portion of a vehicle seat to a position immediately beside the occupant in order to protect the occupant in a side impact and a possible subsequent rollover (overturn).

The airbag apparatus includes a gas generating apparatus called an inflator and which supplies a gas to the cushion portion. The inflator is internally filled with a gas generating agent and is configured to combust the gas generating agent and eject the gas, for example, through a gas ejection port formed in an outer surface of the inflator, when a sensor or the like detects an impact. For the side airbag and the like, a cylindrical (cylinder-shaped) inflator is mostly used.

The cushion portion is divided into a plurality of small rooms (chambers) by sewing or the like. The division into the plurality of chambers allows an impact to be mitigated at a plurality of positions using the single cushion portion or allows the occupant to be restricted, improving occupant protection performance. Channels through which the gas ejected from the inflator flows are formed between the plurality of chambers to enable each of the chambers to inflate and deploy.

However, in an airbag apparatus with a plurality of chambers, for example, when the occupant touches the cushion portion, a reverse flow of the gas may occur between the chambers, making maintenance of the internal pressures of the chambers difficult. In the cushion portion, for example, the chamber positioned close to the gas ejection port of the inflator may have a high pressure, whereas the chamber positioned farthest away from the gas ejection port of the inflator may have a low pressure. In such a case, the gas flows reversely from the high-pressure-side chamber to the low-pressure-side chamber, making the maintenance of the internal pressure of the high-pressure-side chamber difficult.

In this regard, Japanese Patent Application Laid-open No. 2001-63502 describes an airbag with a connection hose provided between a first chamber and a second chamber to serve as a check valve. The connection hose includes an inner cloth disposed therein to separate a fluid passage between the first chamber and the second chamber from a pressure chamber connected to the second chamber. In the airbag, when the internal pressure of the second chamber is lower than the internal pressure of the first chamber, the inner cloth opens the fluid passage. When the internal pressure of the second chamber is higher, the inner cloth closes the fluid channel.

Japanese Patent Application Laid-open No. 2011-255714 describes an airbag with a duct portion disposed to allow a plurality of chambers to communicate with one another and an airbag check valve. The airbag check valve has a cylindrical portion sewn to the duct portion and a tongue-like portion formed at a leading end portion of the cylindrical portion. In this airbag, since the tongue-like portion is formed at the leading end of the cylindrical portion sewn to the duct portion, resistance offered when the gas flows in the reverse direction can be increased. Thus, the tongue-like portion is easily rolled into the cylindrical portion, and the channel of the check valve is easily blocked.

In the technique described in Japanese Patent Application Laid-open No. 2001-63502, the inner cloth disposed in the connection hose has a cylindrical shape, and parts of the inner cloth forming the cylindrical shape stick to each other to prevent the reverse flow of the gas from the second chamber to the first chamber. However, it is difficult to control the direction in which the parts of the cloth forming the cylindrical shape stick to each other. Thus, the technique is disadvantageous in reproducibility.

FIG. 8 and the like in Japanese Patent Application Laid-open No. 2011-255714 disclose a configuration of a check valve with a cylindrical portion and a tongue-like portion in which the tongue-like portion is stuffed into the cylindrical portion toward the center thereof to seal the channel. However, a change in internal pressure after the stuffing may cause the check valve to be collapsed.

With such problems in view, it is an object of the present invention to provide an airbag apparatus that prevents the reverse flow of the gas between the chambers to allow the internal pressures of the chambers to be maintained.

SUMMARY

To accomplish the object, an aspect of the present invention provides a typical configuration of an airbag apparatus. The airbag apparatus is installed in a vehicle, and includes a cushion portion that is a bag-like cushion portion inflated and deployed by a gas, the cushion portion having a division portion that divides an internal space at least into a first chamber and a second chamber, a cylindrical inflator having, in an outer surface thereof, a gas ejection port through which the gas is ejected, a metal annular deflector surrounding a periphery of the inflator with a first gap therebetween to cover the gas ejection port, the deflector having a first end portion projecting in a longitudinal direction of the inflator such that a space is formed between the first end portion and a first end portion of the inflator, and a cloth cylindrical member formed so as to be able to surround a periphery of the deflector with a second gap therebetween. The deflector straddles the division portion. The first end portion of the deflector is positioned in the first chamber side, whereas a second end portion of the deflector is positioned on the second chamber side. The cylindrical member projects from the first end portion of the deflector by a predetermined length so as to allow at least the first gap and the second gap to be covered in the first end portion side of the deflector. At least the first gap near the first end portion of the inflator is larger than the second gap after the inflator operates.

It is assumed that, in the above-described configuration, the first chamber has a higher internal pressure than the second chamber as a result of completion of ejection of the gas. In this case, the gas starts to flow reversely from the first chamber with a high internal pressure toward the second chamber with a low internal pressure. The first gap that is the gap between the inflator and the deflector is larger than the second gap and allows the first chamber and the second chamber to communicate with each other. Thus, in the above-described situation, the gas starts to flow reversely from the first chamber through the first gap to the second chamber. In conjunction with the flow of the gas, the cylindrical member with the predetermined length is deformed from the first end portion side of the deflector toward the inflator. The cylindrical member thus becomes, for example, massive to cover the first gap and the second gap, allowing the gaps to be blocked. Thus, this configuration allows the cylindrical member to act as a check valve that prevents the reverse flow of the gas to allow the pressure of the first chamber to be kept higher than the pressure of the second chamber. The first gap is assumed to be present even when the deflector and the inflator are in contact with each other unless the deflector and the inflator are bound together by adhesion or the like.

On the other hand, when the first chamber has a lower internal pressure than the second chamber as a result of the completion of ejection of the gas, the cylindrical member of the check valve is easily opened in conjunction with the flow of the gas. Thus, the gas can flow from the second chamber through the first gap into the first chamber. The gas continues flowing into the first chamber until the internal pressure of the first chamber becomes sufficiently high. Then, the above-described check valve operates to eventually allow the pressure of the first chamber to be kept higher than the pressure of the second chamber.

Thus, an aspect of the present invention enables the internal pressure of the chamber for which the internal pressure is to be kept high even after completion of ejection of the gas, for example, the chamber with which the occupant is likely to come into contact, to be actually kept higher than the internal pressures of the other chambers.

The predetermined length of the cylindrical member may have at least a value resulting from addition of a second distance that is half an inner diameter of the cylindrical member to a first distance in the space by which the first end portion of the deflector projects from the inflator.

Thus, the cylindrical member has a predetermined length equal to or more than a value of a sum of the first distance and the second distance. When the gas starts to flow reversely, the cylindrical member is deformed utilizing the space formed between the first end portion of the deflector and the first end portion of the inflator, and can reliably cover the first end portion of the inflator in addition to the first gap and the second gap. Consequently, the cylindrical member allows the reverse flow of the gas to be reliably prevented.

In a part of the cylindrical member which has the predetermined length, a contact portion that comes into contact with the inflator may be melted by heat generated in conjunction with ejection of the gas from the inflator, and then fixed to the inflator. Thus, the contact portion is fixed to the inflator to allow the cylindrical member to reliably prevent the reverse flow of the gas.

The cylindrical member and the division portion may be sewn so as to at least partly overlap, and a sewing line resulting from the sewing may be a curve. This avoids forming a gap between the division member and the cylindrical member and enables the first chamber and the second chamber to communicate with each other only inside the cylindrical member. Thus, the pressure of the first chamber can be maintained by allowing the cylindrical member to function as a check valve.

The cylindrical member may be formed of a coat cloth coated with silicon. The coat cloth coated with silicon has small voids. Thus, the cylindrical member formed of the coat cloth allows the reverse flow of the gas to be more stably prevented.

An aspect of the present invention can provide an airbag apparatus that prevents the reverse flow of the gas between the chambers to allow the internal pressures of the chambers to be maintained.

DETAILED DESCRIPTION

Preferred embodiments of the present invention will be described below in detail with reference to the attached drawings. Dimensions, materials, other specific numeral values, and the like illustrated in the embodiments are only illustrative for facilitation of understanding of the present invention and are not intended to limit the present invention unless otherwise specified. In the specification and the drawings, elements having substantially the same functions and configurations are denoted by the same reference numerals so as to omit duplicate descriptions. Furthermore, illustration of elements that are not directly related to the present invention is omitted.

Figure 1:
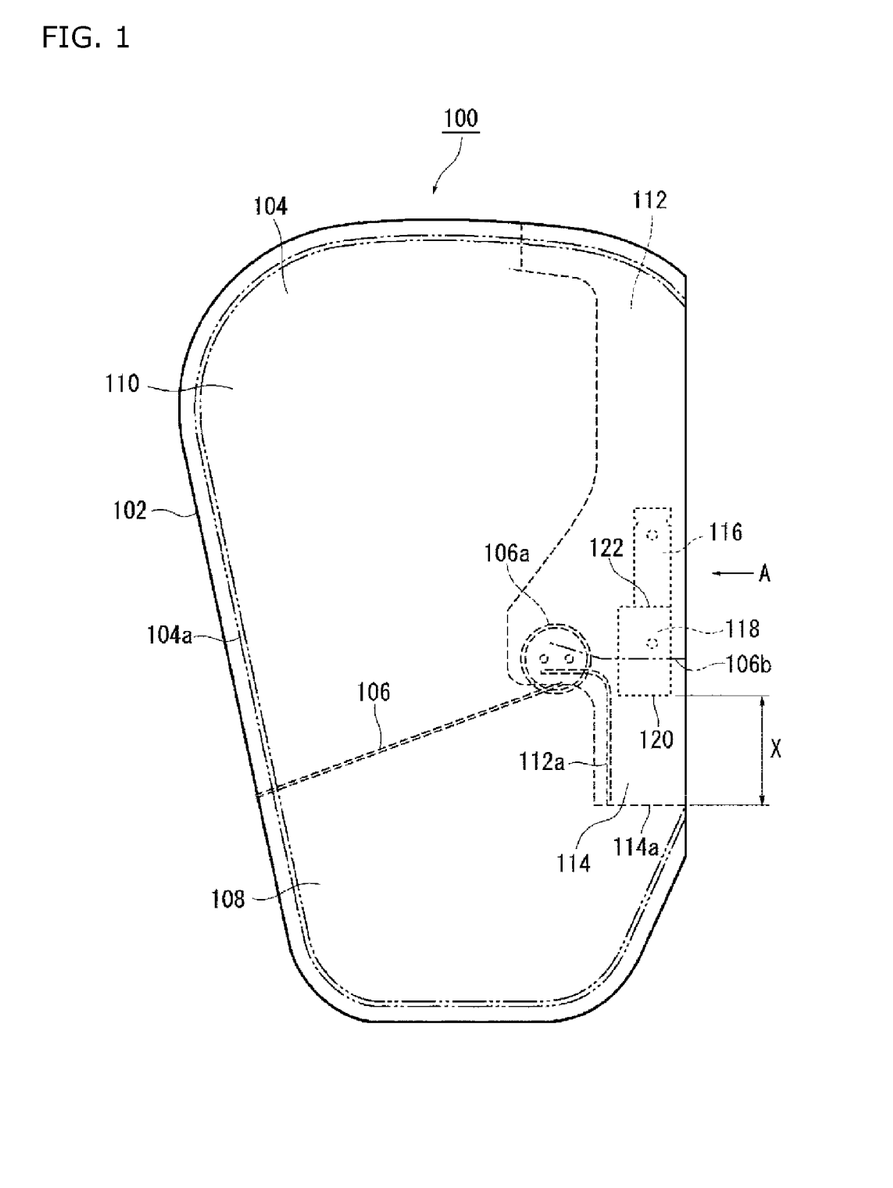
FIG. 1 is a diagram schematically illustrating an airbag apparatus according to an embodiment of the present invention.

FIG. 1 is a diagram schematically illustrating an airbag apparatus according to an embodiment of the present invention. An airbag apparatus 100 includes a cushion portion 102 provided at a side portion of a vehicle seat in a vehicle to inflate and deploy between an occupant sitting in a vehicle seat and a vehicle wall portion (neither the occupant nor the vehicle wall portion is depicted in the drawings). The cushion portion 102 is formed into a bag shape, for example, by a method of sewing a total of two base cloths providing a front surface and a back surface, respectively, or a method of spinning and weaving using one-piece woven (OPW).

The cushion portion 102 includes one fabric (fabric 104) and is peripherally sewn along a sewing line 104a. Furthermore, the cushion portion 102 has an internal space divided by a division portion (first divisional sewing line 106) at least into a first chamber 108 positioned in a lower portion in FIG. 1 and a second chamber 110 positioned above the first chamber 108.

In the airbag apparatus 100, the cushion portion 102 is divided into the plurality of chambers to allow an impact to be mitigated at a plurality of positions by the single cushion portion 102. This enables enhancement of occupant protection function such as protection of a particular part of the occupant. In FIG. 1, the cushion portion 102 is divided into the first chamber 108 and the second chamber 110 along the first divisional sewing line 106. However, the present invention is not limited to this but the cushion portion 102 may further be divided into a plurality of chambers. Alternatively, the cushion portion 102 may be divided using a partition wall called a baffle.

Furthermore, the cushion portion 102 has a separate base cloth 112 sewn to a bag-like inside as depicted by a dotted line in FIG. 1. In FIG. 1, a part of the separate base cloth 112 closer to the reader and a part of the separate base cloth 112 farther from the reader overlap, and at least the vicinity of a lower side end of the separate base cloth 112 is sewn to the inside along the sewing line 112a. Thus, a part of the separate base cloth 112 provides a cylindrical member 114 shaped like a cylinder.

The vicinity of an upper end of the sewing line 112a which forms the cylindrical member 114 is sewn so as to overlap an end 106a of the first divisional sewing line 106. The end 106a of the first divisional sewing line 106 is sewn in a curve so as not to create a gap between the separate base cloth 112 and the first divisional sewing line 106. Thus, in the cushion portion 102, the first chamber 108 and the second chamber 110 are in communication with each other only inside the cylindrical member 114.

The cushion portion 102 is configured to be inflated and deployed by a gas pressure, with a gas generating apparatus (inflator 116) interposed in the cushion portion 102 to serve as a source of a gas. The inflator 116 is, for example, shaped like a cylinder and generates a gas by combusting a gas generating agent internally filling the inflator 116. Furthermore, a deflector 118 is disposed around the inflator 116 to regulate the flow of the gas ejected from the inflator 116.

A second divisional sewing line 106b, along which the separate base cloth 112 and the fabric 104 are sewn together, is positioned inside the cylindrical member 114, depicted by a chain line in FIG. 1, and positioned to traverse the deflector 118 as depicted in FIG. 1. In other words, the deflector 118 straddles the second divisional sewing line 106b serving as a division portion. Thus, the gas from the inflator 116 is fed through a first chamber 108-side first end portion 120 of the deflector 118 to the first chamber 108 and through a second chamber 110-side second end portion 122 to the second chamber 110.

Furthermore, the cylindrical member 114 projects from the first chamber 108-side first end portion 120 of the deflector 118 toward the first chamber 108 by a predetermined length. The predetermined length is illustrated by a dimension X from the first end portion 120 of the deflector 118 to the first end portion 114a of the cylindrical member 114.

Figure 2:
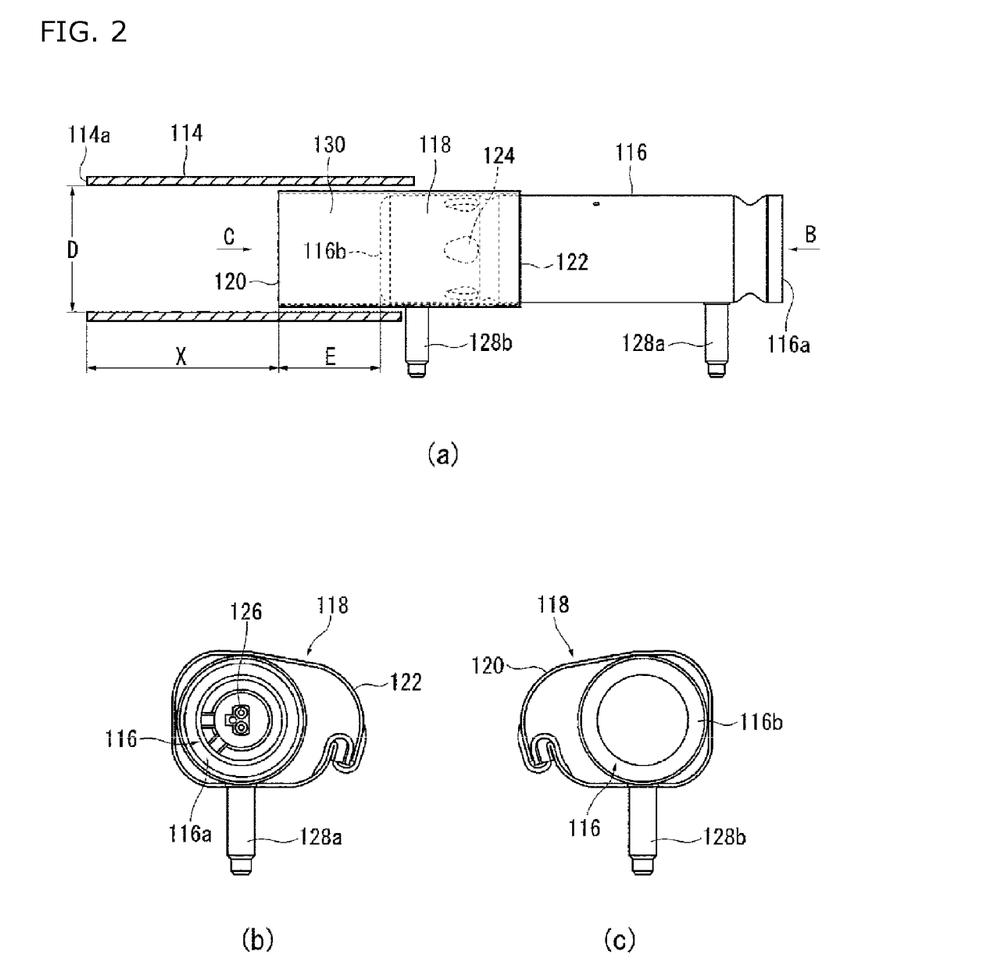
FIGS. 2(a)-2(c) are diagrams illustrating a part of the airbag apparatus in FIG. 1 in detail.

FIG. 2(a)-2(c) are diagrams depicting a part of the airbag apparatus 100 in FIG. 1 in detail. FIG. 2(a) is a diagram of the airbag apparatus 100 as viewed in the direction of arrow A depicted in FIG. 1. FIG. 2(b) is a diagram of the airbag apparatus 100 as viewed in the direction of arrow B depicted in FIG. 2(a). FIG. 2(c) is a diagram of the airbag apparatus 100 as viewed in the direction of arrow C depicted in FIG. 2(b). The cylindrical member 114 is omitted from FIG. 2(b) and FIG. 2(c).

The inflator 116 is cylindrical as illustrated in FIG. 2(a) and has a plurality of gas ejection ports 124 in an outer surface of the inflator 116. The gas resulting from combustion of the gas generating agent inside the inflator 116 is ejected through the gas ejection ports 124.

The inflator 116 has a first end portion 116b and a second end portion 116a. The second end portion 116a is provided with a connector 126 as illustrated in FIG. 2(b). By way of example, a harness (not depicted in the drawings) is connected to the connector 126. The inflator 116 receives a signal indicative of detection of an impact, from a sensor or the like through the harness, to ignite the gas generating agent inside. Two stud bolts 128a and 128b are provided in the outer surface of the inflator 116. The inflator 116 is installed by clamping the stud bolts 128a and 128b to a vehicle sheet.

The deflector 118 is a cylindrically or annularly shaped member that covers a part of the periphery of the inflator 116, that is, at least the gas ejection ports 124. The deflector 118 conducts the gas toward the left and right in FIG. 2(a) along a longitudinal direction of the inflator 116. The left side in FIG. 2(a) corresponds to the first chamber 108 side in FIG. 1. The right side in FIG. 2(a) corresponds to the second chamber 110 side in FIG. 1. The deflector 118 is formed of metal by bending the metal so that the metal surrounds the inflator 116 as illustrated in FIG. 2(b) and FIG. 2(c).

As illustrated in FIG. 2(a), a cloth cylindrical member 114 is provided around the deflector 118. The cylindrical member 114 has an inner diameter D extending along a direction orthogonal to the longitudinal direction of the inflator 116. Furthermore, the cylindrical member 114 has a first end portion 114a projecting from the first chamber 108-side first end portion 120 of the deflector 118 toward the first chamber 108 side by a predetermined length with the dimension X along the longitudinal direction, as described above. Moreover, the deflector 118 forms a space 130 with a dimension E along the longitudinal direction, between the first chamber 108-side first end portion 120 and the first end portion 116b of the inflator 116. In this regard, the first end portion 116b of the inflator 116 is positioned in the first chamber 108 side (see FIG. 3). The dimension E is, in other words, the distance in the space 130 by which the first end portion 120 of the deflector 118 projects from the inflator 116.

Figure 3:
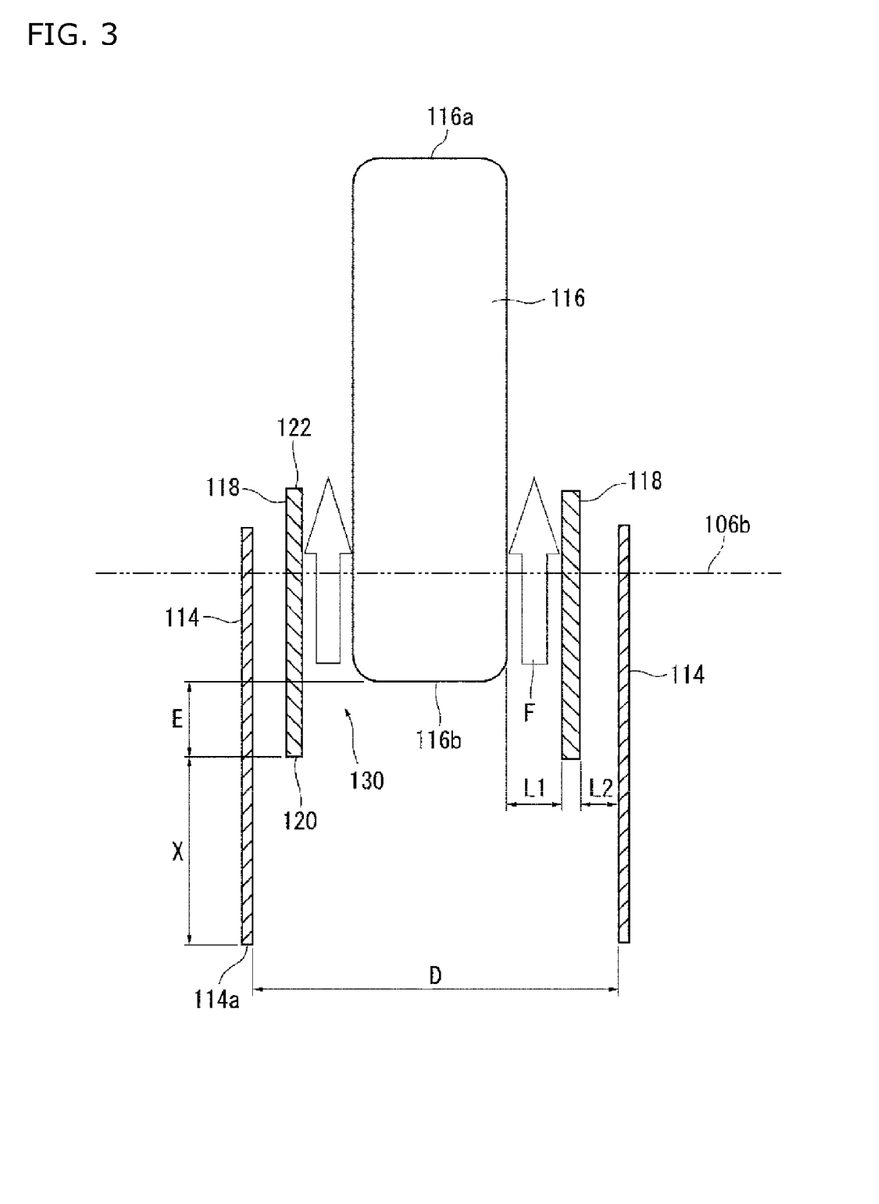
FIG. 3 is a diagram schematically illustrating a part of the airbag apparatus in a state where a cushion portion in FIG. 1 has not been inflated.

FIG. 3 is a diagram schematically illustrating a part of the airbag apparatus 100 in a state where the cushion portion 102 in FIG. 1 has not been inflated. In FIG. 3, a lower side of the second divisional sewing line 106b corresponds to the first chamber 108 side, while an upper side of the second divisional sewing line 106b corresponds to the second chamber 110 side. Moreover, the inner diameter D of the cylindrical member 114, the dimension X corresponding to a predetermined length, and the dimension E in the space 130, all depicted in FIG. 3, are illustrated in association with FIG. 2(a).

As depicted in FIG. 3, the deflector 118 has a first gap L1 between the deflector 118 and the inflator 116. That is, the deflector 118 surrounds the periphery of the inflator 116 with the first gap L1 between the deflector 118 and the inflator 116. Furthermore, as depicted in FIG. 3, the cylindrical member 114 has a second gap L2 between the cylindrical member 114 and the deflector 118. That is, the cylindrical member 114 is formed to be able to surround the periphery of the deflector 118 with the second gap L2 therebetween. The first gap L1 is larger than the second gap L2 in a cross section orthogonal to the longitudinal direction of the inflator 116. As depicted by arrow F in FIG. 3, the first gap L1 allows the first chamber 108 and the second chamber 110 to communicate with each other.

Next, with reference to FIG. 4, a situation will be described in which ejection of the gas from the inflator 116 completes and in which the cushion portion 102 inflates and deploys to cause the gas to, for example, flow reversely from the first chamber 108 with a high internal pressure toward the second chamber 110 with a low internal pressure. Examples of the situation where a difference in internal pressure occurs between the first chamber 108 and the second chamber 110 include a case where the occupant comes into contact with the first chamber 108 and a case where the first chamber 108 is positioned closer to the gas ejection ports 124 of the inflator 116 than the second chamber 110.

Figure 4:
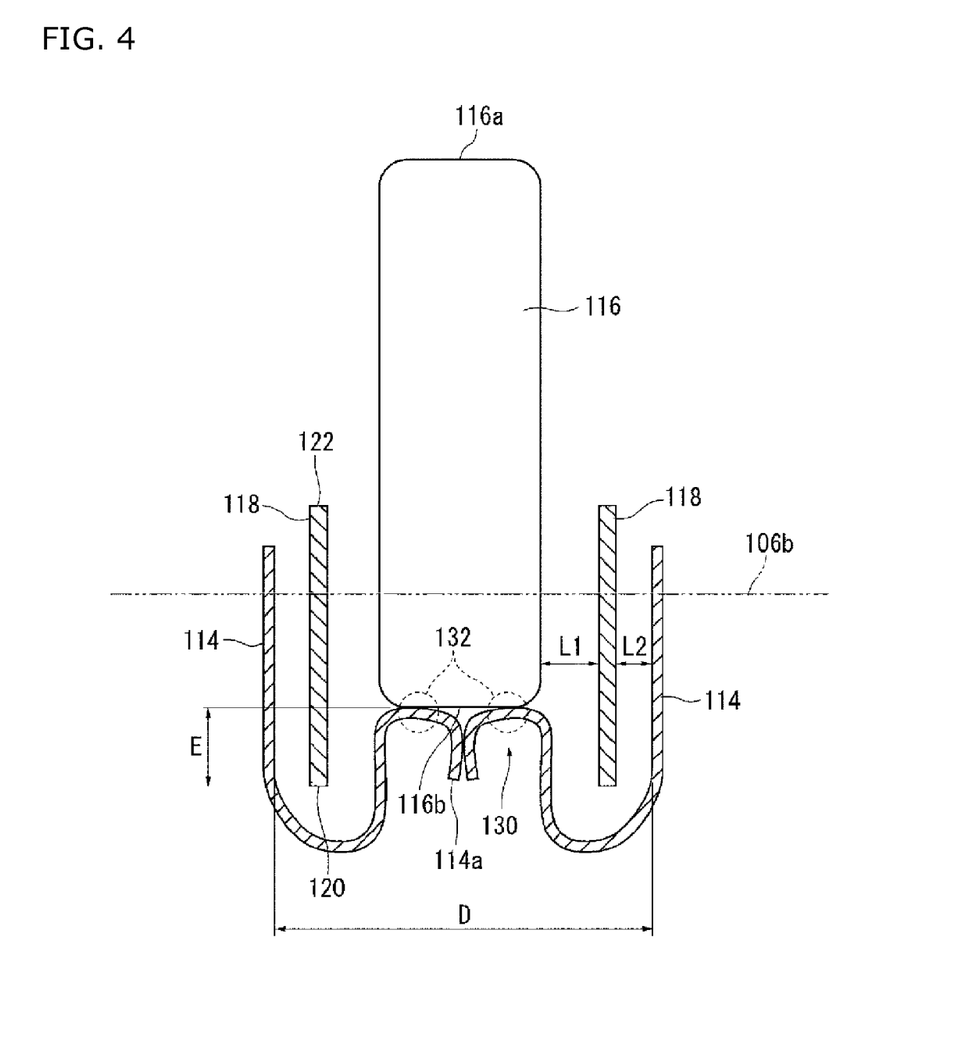
FIG. 4 is a diagram schematically illustrating a part of the airbag apparatus in a state where the cushion portion in FIG. 1 has been inflated.

FIG. 4 is a diagram schematically illustrating a part of the airbag apparatus 100 in which the cushion portion 102 in FIG. 1 has been inflated. In this situation, the gas starts to flow reversely from the first chamber 108 through the first gap L1 to the second chamber 110. However, the cylindrical member 114 has the predetermined length with the dimension X as illustrated in FIG. 3.

Thus, the cylindrical member 114 is caught into spaces 132 with the dimension E in conjunction with the flow of the gas and deformed into masses, which block (seal) the first gap L1 and the second gap L2 as illustrated in FIG. 4. In other words, the cylindrical member 114 is deformed utilizing the space 130 to cover the first gap L1 and the second gap L2 in the first end portion 120 side of the deflector 118. Moreover, the cylindrical member 114 covers the first end portion 116b of the inflator 116. Thus, the cylindrical member 114 functions as what is called a check valve, which prevents the reverse flow of the gas.

Furthermore, a lower limit value for the dimension X at which the cylindrical member 114 functions as a check valve is defined by:

$$X \geq E + D/2 \tag{1}$$

That is, the cylindrical member 114 needs to be caught in the space 130 with the dimension E (first distance) to further cover the deflector 118 and the inflator 116, which are positioned inside the cylindrical member 114. The cylindrical member 114 is deformed from the laterally opposite sides in FIG. 4 toward the center of the inflator 116. Thus, in addition to the dimension E, at least the half D/2 (second distance) of the inner diameter D is needed.

Furthermore, when deformed to prevent the reverse flow of the gas, the cylindrical member 114 contacts the first end portion 116b of the inflator 116 in areas (contact areas 132) enclosed by dotted lines in FIG. 4. In this regard, the inflator 116 generates heat in conjunction with ejection of the gas.

Thus, the contact areas 132 of the cylindrical member 114 are melted by heat from the inflator 116 and fixed to the inflator 116. The contact areas 132 are fixed to the inflator 116 to allow the cylindrical member 114 to more reliably prevent the reverse flow of the gas.

Moreover, the cylindrical member 114, functioning as a check valve, is preferably formed of a coat cloth coated with silicon. The coat cloth has smaller voids than a non-coat cloth and allows the passage of the gas to be more appropriately prevented.

Thus, in the airbag apparatus 100, the cylindrical member 114 functions as a check valve to prevent the reverse flow of the gas between the first chamber 108 and the second chamber 110. For example, the internal pressure of the high-pressure-side first chamber 108 can be stably maintained.

Figure 5:
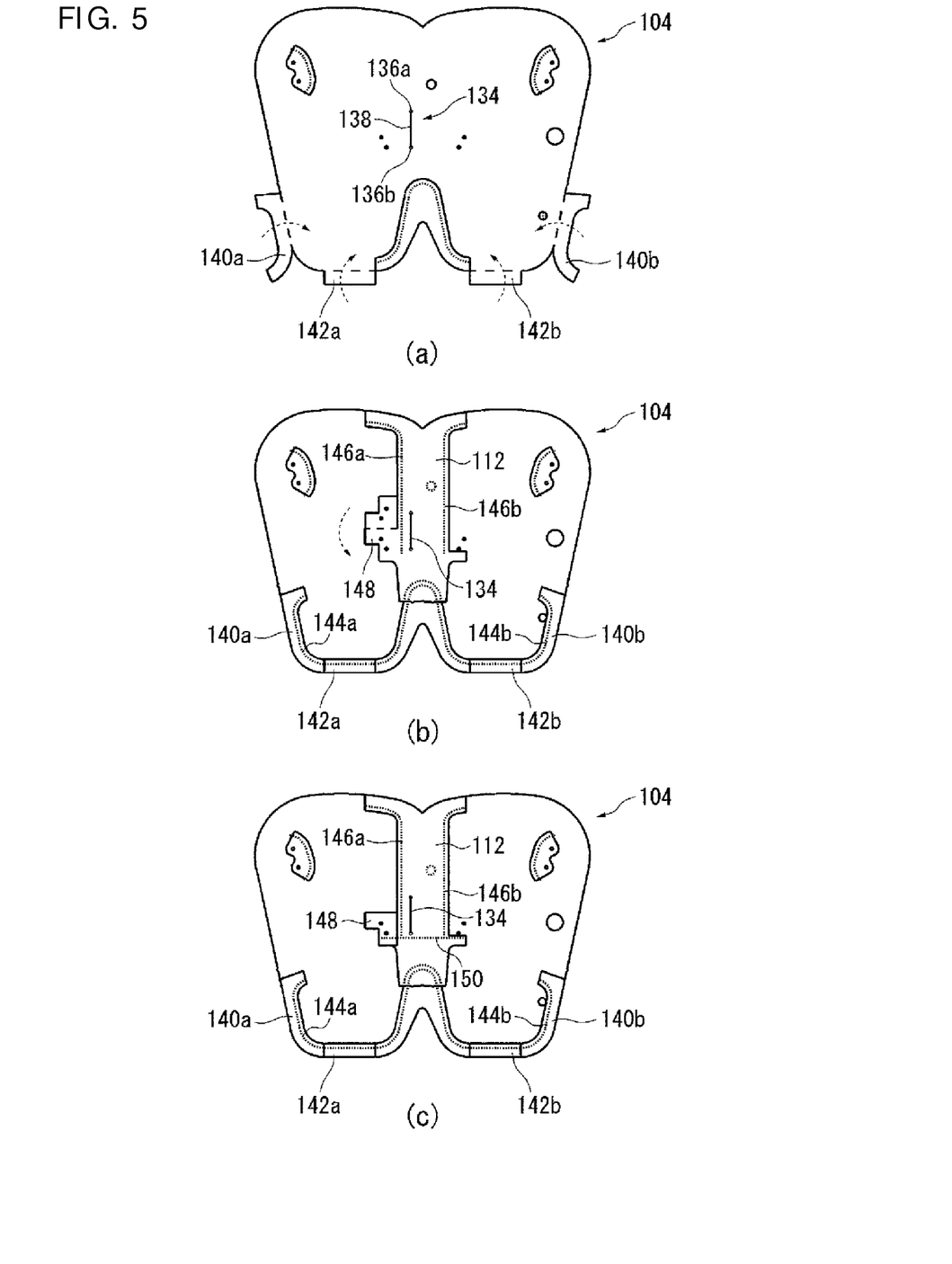
FIGS. 5(a)-5(c) are diagrams illustrating a sewing procedure for the cushion portion in FIG. 1.

Next, with reference to FIGS. 5(a)-5(c) and FIGS. 6(a)-(e), a sewing procedure will be described in which the cushion portion 102 illustrated in FIG. 1 is formed from a fabric 104 by sewing. FIGS. 5(a)-5(c) are diagrams illustrating a sewing procedure for the cushion portion 102 in FIG. 1. FIGS. 6(a)-6(e) are diagrams illustrating a sewing procedure continued from FIG. 5.

As illustrated in FIG. 5(a), first, the fabric 104 with a laterally symmetric shape is prepared. An inflator attachment portion 134 is formed in the fabric 104. The inflator attachment portion 134 has two hole portions 136a and 136b through which the above-described stud bolts 128a and 128b of the inflator 116 are inserted and a slit 138 formed between the hole portions 136a and 136b. Then, side edges 140a and 140b and lower edges 142a and 142b all of which are located in a lower portion of the fabric 104 are folded back along dotted arrows depicted in FIG. 5(a).

Subsequently, as illustrated in FIG. 5(b), the side edges 140a and 140b and lower edges 142a and 142b, all of which are located in the lower portion of the fabric 104 and which have been folded back in FIG. 5(a), are sewn along sewing lines 144a and 144b. Furthermore, the separate base cloth 112 is applied to the vicinity of the center of the fabric 104 and sewn to the fabric 104 along sewing line 146a and 146b. Moreover, the separate base cloth 112 includes a projecting portion 148 on a left side thereof in FIG. 5(b). An upper side of the projecting portion 148 is folded back downward as depicted by an arrow in FIG. 5(b).

Then, as illustrated in FIG. 5(c), the separate base cloth 112 including the projecting portion 148 folded back in FIG. 5(b) is sewn to the fabric 104 along a sewing line 150.

Figure 6:
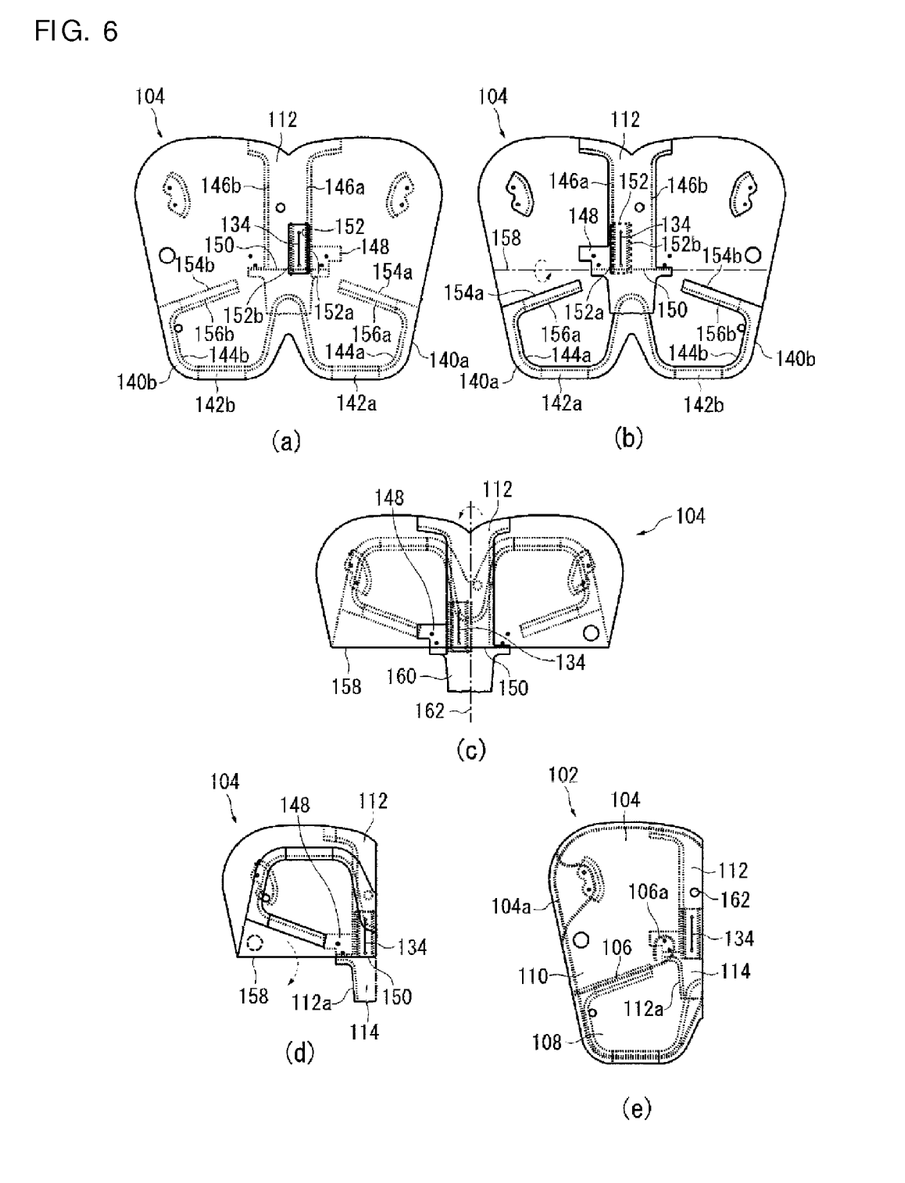
FIGS. 6(a)-6(e) are diagrams illustrating a sewing procedure continued from FIG. 5.

FIG. 6(a) illustrates a back surface of the fabric 104. A reinforcement cloth 152 allowing the inflator attachment portion 134 to be reinforced is sewn to the back surface of the fabric 104 along sewing lines 152a and 152b. Furthermore, reinforcement cloths 154a and 154b depicted by dotted lines in FIG. 6(a) are sewn to a front surface of the fabric 104 along sewing lines 156a and 156b; the reinforcement cloths 154a and 154b allow reinforcement of the above-described first divisional sewing line 106 (see FIG. 1), which allows the first chamber 108 and the second chamber 110 to be separated from each other.

FIG. 6(b) also illustrates the front surface of the fabric 104. A lower side of the fabric 104 is folded back toward a side farther from the reader as shown by an arrow in FIG. 6(b), along a line 158 depicted by an alternate long and dash line.

As illustrated in FIG. 6(c), a part of the separate base cloth 112, that is, a part 160 of the separate base cloth 112 which forms the cylindrical member 114, sticks out from the fabric 104 with the lower side thereof folded back. Then, a right side of the fabric 104 is folded back as shown by an arrow in FIG. 6(c), along a line 162 depicted by an alternate long and short dash line.

Subsequently, as illustrated in FIG. 6(d), the part 160 (see FIG. 6(c)) of the folded separate base cloth 112 folded back on itself is sewn along the above-described sewing line 112a (see FIG. 1) to form the above-described cylindrical member 114. Then, as depicted by an arrow in FIG. 6(d), the lower side of the fabric 104 folded back on itself is drawn out again. Moreover, the right side of the fabric 104 is folded back leftward.

Then, as illustrated in FIG. 6(e), the periphery of the fabric 104 folded back on itself is sewn along a sewing line 104a to form the cushion portion 102 shaped like a bag. Then, the cushion portion 102 is divided along the second divisional sewing line 106 into the first chamber 108 and the second chamber 110.

Finally, the inflator 116 and the deflector 118 are inserted, via the inflator attachment portion 134, into the cushion portion 102 with the first chamber 108 and the second chamber 110 to form the airbag apparatus 100 illustrated in FIG. 1. For example, the harness connected to the connector 126 of the inflator 116 may be drawn out via the hole portion 162 illustrated in FIG. 6(e).

Figure 7:
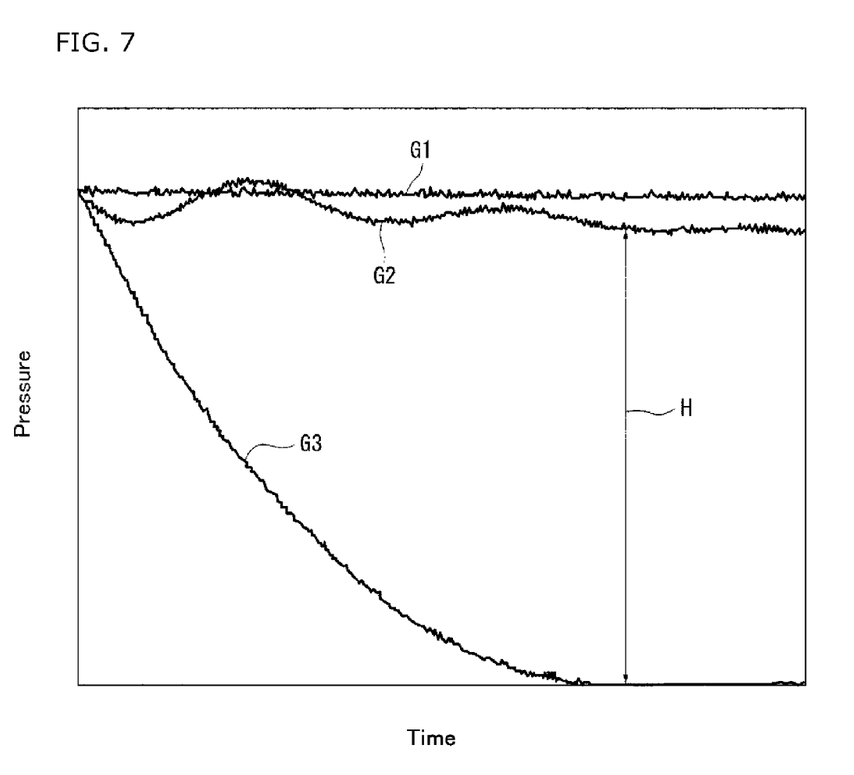
FIG. 7 is a graph depicting temporal changes in the internal pressure of a first chamber in FIG. 1.

FIG. 7 is a graph depicting temporal changes in the internal pressure of the first chamber 108 in FIG. 1. In FIG. 7, the axis of abscissas represents time, and the axis of ordinate represents the internal pressure of the first chamber 108. Furthermore, a graph G1 depicts temporal changes in internal pressure observed when the cylindrical member 114, which functions as a check valve, is formed of a coat cloth. A graph G2 illustrates a case where the cylindrical member 114 is formed of a non-coat cloth instead of the coat cloth. A graph G3 illustrates temporal changes in internal pressure in a comparative example where no check valve is provided.

As illustrated in FIG. 7, the graphs G1 and G2 indicate more moderate temporal changes in internal pressure than the graph G3 in the comparative example. In particular, the graph G1 indicates that the cylindrical member 114 formed of a coat cloth with small voids functions as a check valve, keeping the internal pressure substantially constant as illustrated in FIG. 4. The graph G2 depicts that, although the cylindrical member 114 is formed of a non-coat cloth, temporal changes in internal pressure are moderate, indicating that cylindrical member 114 has sufficient functions as a check valve.

On the other hand, the graph G3 indicates that the lack of a check valve causes the gas to flow reversely from the high-pressure-side first chamber 108 to the low-pressure-side second chamber 110, resulting in a reduction in internal pressure in a short time (for example, several tens of ms). Even after the internal pressure is reduced as illustrated in graph G3, the internal pressure in graph G2 is sufficiently maintained as depicted by arrow H in FIG. 7.

As described above, in the present embodiment, the first gap L1, that is, the gap between the inflator 116 and the deflector 118, is larger than the second gap L2, allowing the first chamber 108 and the second chamber 110 to communicate with each other. Thus, when ejection of the gas from the inflator 116 completes and the gas starts to flow reversely from the high-pressure-side first chamber 108 toward the low-pressure-side second chamber 110 through the first gap L1, the cylindrical member 114 with the predetermined length with the dimension X is deformed utilizing the space 130 between the first end portion 120 of the deflector 118 and the first end portion 116b of the inflator 116 to allow the first end portion 116b of the inflator 116 to be reliably covered in addition to the first gap L1 and the second gap L2 as illustrated in FIG. 4. That is, the cylindrical member 114 projects from the first end portion 120 of the deflector 118 by the predetermined length so as to allow at least the first gap L1 and the second gap L2 to be covered in the first end portion 120 side of the deflector 118.

Thus, in the present embodiment, the cylindrical member 114 serves as a check valve that prevents the reverse flow of the gas to allow the pressure of the first chamber 108 to be maintained. On the other hand, when completion of ejection of the gas results in the internal pressure of the first chamber 108 being lower than the internal pressure of the second chamber 110, the cylindrical member 114 as a check valve is easily opened in conjunction with the flow of the gas. Thus, the gas can flow from the second chamber 110 through the first gap L1 into the first chamber 108. The gas continues to flow in until the internal pressure of the first chamber 108 is higher than the internal pressure of the second chamber 110, and then the check valve operates to keep the internal pressure of the first chamber 108 higher than the internal pressure of the second chamber 110.

As described above, the present embodiment enables the internal pressure of the chamber for which the internal pressure is to be kept high even after completion of ejection of the gas, for example, the chamber with which the occupant is likely to come into contact, to be actually kept higher than the internal pressures of the other chambers.

Furthermore, the cylindrical member 114 has the contact areas 132 that come into contact with the inflator 116 when the cylindrical member 114 is deformed as a check valve, and the contact areas 132 are melted by heat generated in conjunction with ejection of the gas from the inflator 116 and are then fixed to the first end portion 116b of the inflator 116. Thus, the contact areas 132 come into contact with the inflator 116 to allow the cylindrical member 114 to reliably prevent the reverse flow of the gas.

Furthermore, the cylindrical member 114 and the first divisional sewing line 106 depicted as a curve are sewn so as to at least partly overlap. Thus, no gap is formed between the first divisional sewing line 106 and the cylindrical member 114. This enables the first chamber 108 and the second chamber 110 to communicate with each other only inside the cylindrical member 114. Therefore, the internal pressure of the first chamber 108 can be maintained by allowing the cylindrical member 114 to function as a check valve.

Figure 8:
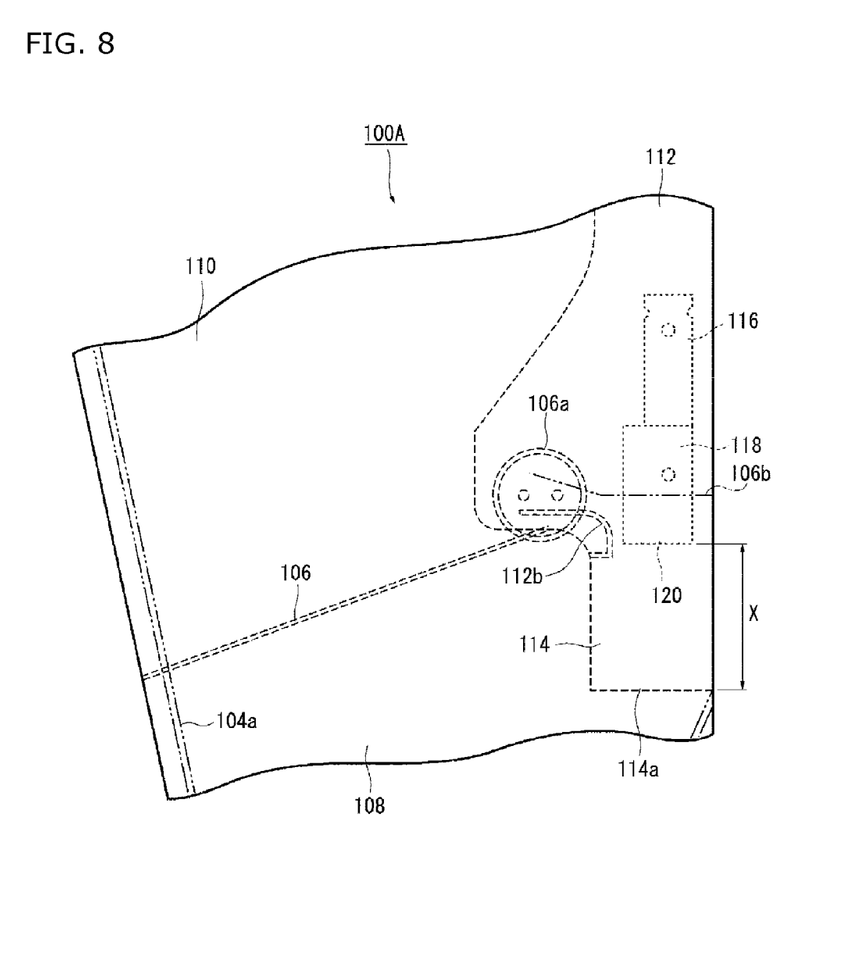
FIG. 8 is a diagram illustrating a variation of the airbag apparatus seen in FIG. 1.

FIG. 8 is a diagram illustrating a variation of the airbag apparatus 100 in FIG. 1. The airbag apparatus 100A is different from the airbag apparatus 100 in the sewing line 112b forming the cylindrical member 114. As depicted by the sewing line 112b, the cylindrical member 114 is not sewn up to the first chamber 108-side first end portion 114a. This cylindrical member 114 also has the predetermined length with the dimension X and is thus deformed toward the center of the inflator 116 to function as a check valve when the gas starts to flow reversely.

Thus, the airbag apparatus 100A can also maintain the pressure of the first chamber 108. Furthermore, when the internal pressure of the first chamber 108 is lower than the internal pressure of the second chamber 110, the cylindrical member 114 is more easily opened in conjunction with the flow of the gas. Consequently, the gas can flow from the second chamber 110 toward the first chamber 108.

The preferred embodiment of the present invention has been described above with reference to the attached drawings. However, it is needless to say that the present invention is not limited to the embodiment. It would be obvious to those skilled in the art that various variations or modifications can be arrived at within the scope set forth in the claims, and it should be understood that those variations or modifications also belong to the technical scope of the present invention.

The present invention can be utilized for an airbag apparatus installed in a vehicle to inflate and deploy in order mainly to protect an occupant in case of emergency.

What is claimed is:

1. An airbag apparatus installed in a vehicle, comprising:
a cushion portion that is configured to be inflated and deployed by a gas, the cushion portion having a division portion that divides an internal space of the cushion portion into at least a first chamber and a second chamber;
an inflator including, in a cylindrical outermost surface thereof, a gas ejection port through which the gas is ejected;
a deflector formed of a bent metal sheet surrounding a periphery of the inflator with a first gap therebetween and covering the gas ejection port, the deflector having a first end portion projecting in a longitudinal direction of the inflator such that a space is formed between the first end portion of the deflector and a first end portion of the inflator; and
a cloth cylindrical member formed so as to be able to surround a periphery of the deflector and defining a second gap between the cylindrical member and the periphery of the deflector,
the deflector straddling the division portion, and the first end portion of the deflector is positioned toward the first chamber, whereas a second end portion of the deflector is positioned toward the second chamber,
a projecting portion of the cylindrical member projecting from the first end portion of the deflector by a length sufficient to allow at least the first gap and the second gap to be covered by the projecting portion at the first end portion of the deflector, and
the first gap near the first end portion of the inflator being larger than the second gap after the inflator operates.

2. The airbag apparatus according to claim 1, wherein the length of the projecting portion of the cylindrical member is at least equal to a value resulting from addition of a second distance that is half of an inner diameter of the cylindrical member to a first distance between the first end portion of the deflector and the first end portion of the inflator along a longitudinal direction of the inflator.

3. The airbag apparatus according to claim 1, wherein the cylindrical member is formed of a coat cloth coated with silicon.

4. The airbag apparatus according to claim 1, wherein the inflator is cylindrical in shape.

5. The airbag apparatus according to claim 1, wherein the deflector is formed of metal.

6. The airbag apparatus according to claim 1, wherein the deflector has an annular shape in cross section.

7. The airbag apparatus according to claim 1, wherein the cushion portion is in the form of a bag.

8. An airbag apparatus installed in a vehicle, comprising:
a cushion portion that is configured to be inflated and deployed by a gas, the cushion portion having a division portion that divides an internal space of the cushion portion into at least a first chamber and a second chamber;
an inflator including, in an outer surface thereof, a gas ejection port through which the gas is ejected;
a deflector surrounding a periphery of the inflator with a first gap therebetween and covering the gas ejection port, the deflector having a first end portion projecting in a longitudinal direction of the inflator such that a space is formed between the first end portion of the deflector and a first end portion of the inflator; and
a cloth cylindrical member formed so as to be able to surround a periphery of the deflector and defining a second gap between the cylindrical member and the periphery of the deflector,
the deflector straddling the division portion, and the first end portion of the deflector is positioned toward the first chamber, whereas a second end portion of the deflector is positioned toward the second chamber,
a projecting portion of the cylindrical member projecting from the first end portion of the deflector by a length sufficient to allow at least the first gap and the second gap to be covered by the projecting portion at the first end portion of the deflector, and
the first gap near the first end portion of the inflator being larger than the second gap after the inflator operates;
wherein the projecting portion of the cylindrical member has a contact portion that upon coming into contact with the inflator is configured to melt from heat generated in conjunction with ejection of the gas from the inflator, and then fixate to the inflator.

9. An airbag apparatus installed in a vehicle, comprising:
a cushion portion that is configured to be inflated and deployed by a gas, the cushion portion having a division portion that divides an internal space of the cushion portion into at least a first chamber and a second chamber;
an inflator including, in an outer surface thereof, a gas ejection port through which the gas is ejected;
a deflector surrounding a periphery of the inflator with a first gap therebetween and covering the gas ejection port, the deflector having a first end portion projecting in a longitudinal direction of the inflator such that a space is formed between the first end portion of the deflector and a first end portion of the inflator; and
a cloth cylindrical member formed so as to be able to surround a periphery of the deflector and defining a second gap between the cylindrical member and the periphery of the deflector,
the deflector straddling the division portion, and the first end portion of the deflector is positioned toward the first chamber, whereas a second end portion of the deflector is positioned toward the second chamber,
a projecting portion of the cylindrical member projecting from the first end portion of the deflector by a length sufficient to allow at least the first gap and the second gap to be covered by the projecting portion at the first end portion of the deflector, and
the first gap near the first end portion of the inflator being larger than the second gap after the inflator operates;
wherein the cylindrical member and the division portion are sewn so as to at least partly overlap, and a sewing line resulting from the sewing is along a curve.

* * * * *